United States Patent
Fokoue-Nkoutche et al.

(10) Patent No.: US 7,860,816 B2
(45) Date of Patent: Dec. 28, 2010

(54) METHOD AND APPARATUS FOR SAFE ONTOLOGY REASONING

(75) Inventors: Achille Fokoue-Nkoutche, White Plains, NY (US); Genady Grabarnik, Scarsdale, NY (US); Nagui Halim, Yorktown Heights, NY (US); Aaron Kershenbaum, New City, NY (US); Edith Schonberg, New York, NY (US); Larisa Shwartz, Scarsdale, NY (US); Kavitha Srinivas, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 11/931,601

(22) Filed: Oct. 31, 2007

(65) Prior Publication Data

US 2008/0065578 A1 Mar. 13, 2008

Related U.S. Application Data

(63) Continuation of application No. 11/361,293, filed on Feb. 23, 2006, now abandoned.

(51) Int. Cl.
G06N 5/00 (2006.01)

(52) U.S. Cl. .......................... 706/47; 706/45

(58) Field of Classification Search ............ 706/47, 706/45

See application file for complete search history.

(56) References Cited

U.S. PATENT DOCUMENTS

| 5,187,480 A * | 2/1993 | Thomas et al. ................. 341/22 |
| 7,093,200 B2 | 8/2006 | Schreiber et al. |
| 7,099,885 B2 | 8/2006 | Hellman et al. |

OTHER PUBLICATIONS

Haber, et al., Audit-Log Integrity Using Redactable Signatures with Pseudonyms, Applied Cryptography and Network Security, 4th Int'l Conference, ACNS 2006, Jun. 2006, pp. 1-14.*
F. Maffioli, "Subgradient Optimization, Matroid Problems and Heuristic Evaluation", Proceedings of the 7th IFIP Conference on Optimization Techniques: Modeling and Optimization in the Service of Man, 1975 pp. 389-396.
R. M. Karp, "*Reducibility among combinatorial problems,*" in *Complexity of Computer Computations: Proc. of a Symp. on the Complexity of Computer Computations*, R. E. Miller and J. W. Thatcher, Eds., The IBM Research Symposia Series, New York, NY: Plenum Press, 1972, pp. 85-103.

(Continued)

*Primary Examiner*—Wilbert L Starks, Jr.

(57) ABSTRACT

The present invention is a method and apparatus for safe ontology reasoning. In one embodiment, a method for building safe sub-ontology that includes one or more elements of a given ontology includes designating at least one the elements as a sensitive element, where a sensitive element is an element not to be revealed. The method then designates a safe sub-ontology such that the safe sub-ontology does not include any elements that, alone or in combination, allow inference of a sensitive element, in accordance with one or more given inference rules. In another embodiment, a method for building a potential sub-ontology includes designating at least one of the elements as a sensitive element and including a maximal number of the elements in the potential sub-ontology, wherein the maximal number includes the greatest number of elements that can be revealed, cumulatively, without allowing inference of a sensitive element, in accordance with one or more given inference rules.

20 Claims, 4 Drawing Sheets

OTHER PUBLICATIONS

H. Whitney, "On the Abstract Properties of Linear Dependence", Amer. J. of Math 57, 1935, pp. 509-533.

Lawler, E. L. "Polynomial-bounded and (apparently) non-polynomial-bounded matroid computations", In *Combinatorial Algorithms (Courant Comput. Sci. Sympos.*, No. 9), 1973 pp. 49-57. Algorithmics Press, NY. 1973.

Camerini, P. M., F. Maffioli. "Heuristically guided algorithms for K-parity matroid problems", *Discrete Math.* 1978, pp. 103-116.

J. Hendler et. al., "Integrating Applications on the Semantic Web", Journal of the Institute of Electrical Engineers of Japan, vol. 122(10), Oct. 2002, pp. 676-680.

D.Wietzner, "Semantic Web Public Policy Challenges: Privacy, Provenance, Property and Personhood", ISWC 2005 Keynote.

M.Smith, et.al. Editors, OWL Web Ontology Language Guide, W3C Recommendation Feb. 10, 2004.

E. Boros, "On the complexity of some enumeration problems for matroids", preprint, DIMACS TR, 2003-17.

Grau, et al., "Modularity and Web Ontologies", Paper, Maryland Information and Network Dynamics Lab, 2004, pp. 1-41.

Grau, et al. Ontology Reuse: Better Safe Than Sorry, Presentation, The University of Manchester, Jun. 8, 2007, pp. 1-49.

Korpilahti, T., Architecture for Distributed Development of an Ontology Library, Thesis, Helsinki University of Technology, Department of Computer Science and Engineering, Mar. 31, 2004, pp. 1-60.

Mehandjiev, et al., Interoperability Aspects of CrossWork, Presentation, Enterprise Interoperability Information Day, OMG TG, Athens Greece, Apr. 13, 2005, pp. 1-16.

\* cited by examiner

METHOD AND APPARATUS FOR SAFE ONTOLOGY REASONING

CROSS REFERENCE TO RELATED APPLICATIONS

This application is a continuation of U.S. patent application Ser. No. 11/361,293, filed Feb. 23, 2006, now abandoned, which is herein incorporated by reference in its entirety.

BACKGROUND

The invention relates generally to ontology processing, and relates more particularly to ontology security.

A central issue under consideration by the World Wide Web Consortium is ontology security and privacy. In particular, as ontologies proliferate and automatic reasoners become more powerful, it becomes more difficult to protect sensitive information. That is, as facts can be inferred from other facts, it becomes increasingly likely that information included in an ontology, while not sensitive itself, may nevertheless enable inference of information that is deemed sensitive.

A competing concern, on the other hand, is the ability to provide an adequate or useful amount of information for ontology processing applications such as querying, navigating and reasoning. This concern is often at odds with the desire to limit or prevent access to information that may contribute to the inference of sensitive information.

Thus, there is a need for a method and apparatus for safe ontology reasoning.

SUMMARY OF THE INVENTION

The present invention is a method and apparatus for safe ontology reasoning, where the "safety" of an ontology encompasses both privacy concerns and security concerns. In one embodiment, a method for building safe sub-ontology that includes one or more elements of a given ontology includes designating at least one the elements as a sensitive element, where a sensitive element is an element not to be revealed. The method then designates a safe sub-ontology such that the safe sub-ontology does not include any elements that, alone or in combination, allow inference of a sensitive element, in accordance with one or more given inference rules. In another embodiment, a method for building a potential sub-ontology includes designating at least one of the elements as a sensitive element and including a maximal number of the elements in the potential sub-ontology, wherein the maximal number includes the greatest number of elements that can be revealed, cumulatively, without allowing inference of a sensitive element, in accordance with one or more given inference rules.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
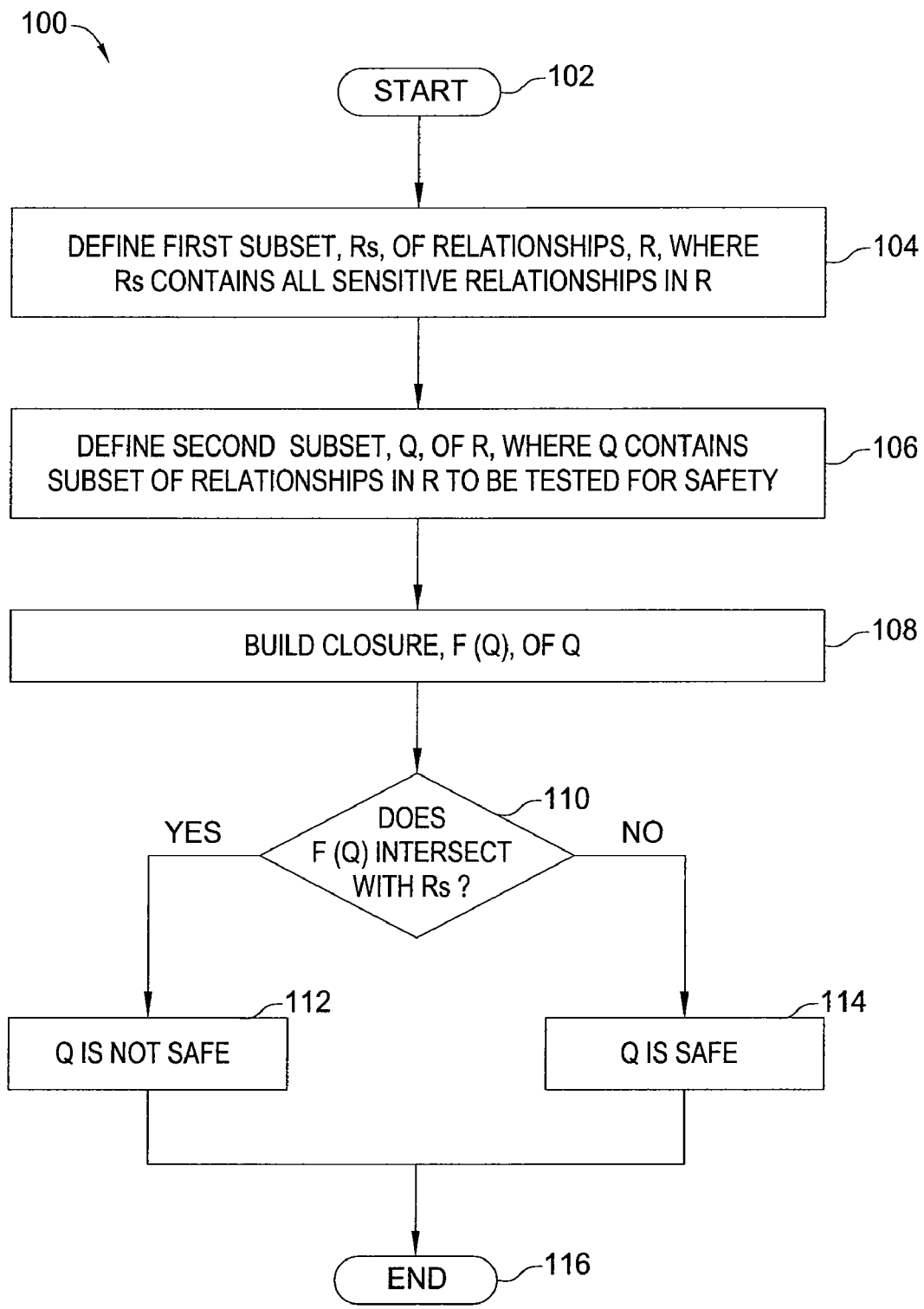
FIG. 1 is a flow diagram illustrating one embodiment of a method for testing a subset of an ontology for "safeness", according to the present invention.

In one embodiment, the present invention is method and apparatus for safe ontology reasoning. Within the context of the present invention, the "safety" of an ontology refers to the ontology's ability to address both privacy concerns and security concerns. Embodiments of the present invention preserve the integrity of sensitive information in an ontology framework by verifying the safety of a sub-ontology made available for querying, navigating, reasoning and other ontology processing applications. In particular, the present invention verifies not only that sensitive information is not included in the sub-ontologies, but also that information from which the sensitive information can be inferred is not included in the sub-ontologies. This substantially reduces the likelihood of sensitive information being even inadvertently revealed. Moreover, the present invention maximizes the amount of information that is provided in the safe ontology, so that the ontology can provide as much useful information as possible while still remaining "safe" with respect to the sensitive information.

Within the context of the present invention, a "safe" or "secure" ontology (or sub-ontology) is defined as one that does not contain any information that may be used to derive sensitive facts, given a collection of inference rules.

Embodiments of the present invention define an ontology, O, as a tuple {I, R, M} comprising a finite set of concepts, where I is a finite set of individuals, R is a finite set of relationships and M is a finite set of metadata (which may include characteristics of relations, such as symmetry or transitivity, or constraints on relationships, such as restrictions of the number of relationships of a given type that can exist between individuals).

A relationship, r, in the set R is expressed as a set of triples in the form:

(subject, property, object)

where "subject" is an individual (e.g., i in the set I), "property" is a specific type of relationship, and "object" is an expression composed of individuals and the logical operators AND, OR and NOT. For example, the relationships (Jim isMemberOf man), (man isEquivalentTo (person AND male)) and (American is SubsetOf person) are all expressed as sets of triples.

Pieces, m, of metadata in M are also expressed as triples. Specifically, a piece, m, of metadata is expressed as:

(property, constraint, value)

where "property" corresponds to the specific type of relationship (e.g., the middle member of a relationship triple, such as isMemberOf or isEquivalentTo), "value" is a property or constant, and "constraint" is a member of {<=>inverseOf subPropertyOf disjointFrom is}. For example, the pieces of metadata (isSubsetOf is transitive), (name=1), (spouse<2) and (parentOf inverseOf childOf) are all expressed as sets of triples.

Types of metadata give rise to inference rules. For instance, the piece of metadata (ancestorOf is transitive)—i.e., the property "ancestorOf" is transitive—allows one to infer that if (Adam ancestorOf Bob) and (Bob ancestorOf Carl), then (Adam ancestorOf Carl).

In one embodiment, the present invention extends the definition of an ontology to include restricted relations of the form FOR_ALL individuals, i, in class c, there exists an individual, j, in class D such that (i property j) and FOR_ALL individuals, i, in class C, there exists an individual, j, such that (i property j), then j is a member of class D.

The closure, F(R), of a set of relations, R, is defined as the total set of relations or facts that can be inferred from the given set of relations, R, and the inference rules implied by the set of metadata, M. If the set of metadata, M, is relatively simple, the closure, F(R), of the set of relations, R, is also simple to determine. For example, if the set of metadata, M, only contains: (isSubsetOf is transitive), (isEquivalentTo is transitive) and (isEquivalentTo is symmetric), then, given a set of relations, R of the form: (x isSubsetOf y), (w isEquivalentTo z) and (i isA C), the closure, F(R), of the set of relations, R, can be computed by considering a graph, G, with edge set R (i.e., the sets of triples in the set of relations, R, define the set of edges of the graph, G, and the endpoints of the edges define the set of nodes). That is, where the only available inference mechanism is transitivity, facts may be inferred from other individual facts. In this case, the only inferences that can be made are membership inferences (i.e., one can infer whether a set is equivalent to or is a subset of another set, or whether an individual is a member of a set). The problem of determining the closure, F(R), of the set of relations, R, thus involves simply identifying the "reachability" set of each node, n, in the graph, G (i.e., determining for which set of nodes, s, a path exists from n to s). This can be easily computed, for example, by using breadth first search.

In a more general case, other transitive relations may exist, such as "isPartOf". For example: (USA isPartOf NorthAmerica), (State Pennsylvania isPartOf USA) or (City Philadelphia isPartOf State Pennsylvania). Membership, in this case, can still be determined using a simple search algorithm; however, the search must be sensitive to the fact that paths must comprise properties of the same type. This can also be extended to the case where different types of properties interact to form paths by declaring all such groups of properties as sub-properties of a single transitive property.

FIG. 1 is a flow diagram illustrating one embodiment of a method 100 for testing a subset of an ontology, O (where O={I, R, M}), for "safeness", according to the present invention.

The method 100 is initialized at step 102 and proceeds to step 104, where the method 100 defines a first subset, $R_s$, of the set of relationships, R, in the given ontology, O. Specifically, the first subset, $R_s$, contains all sensitive relationships (facts) in the set of relationships R. For example, the first subset, $R_s$, may contain the triple: $T_1$=(A is subSetOf E). In one embodiment, the first subset, $R_s$, may be defined for the method 100 by an external source (e.g., a human operator).

In step 106, the method 100 defines a second subset, Q, of the set of relationships, R. The second subset, Q, contains a test subset of relationships from the set of relationships, R. That is, the second subset, Q, is to be tested to determine its safety. For example, the second subset, Q, may contain the triples: $T_2$=(A isEquivalentTo (B AND C)), $T_3$=(A is subSetOf D), and $T_4$=(E isEquivalentTo (B AND (C AND D))).

In one embodiment, the second subset, Q, may be defined for the method 100 by an external source (e.g., a human operator).

In step 108, the method 100 builds the closure, F(Q) of the second subset, Q, e.g., as described above. In step 110, the method 100 determines whether the closure, F(Q), of the second subset, Q, intersects with the first subset, $R_s$. In general, given one or more sets of relations, $M_{si}^k$, for each $r_{si}$ in the first subset, $R_s$, where $r_{si}$ can be inferred from $M_{si}^k$, but cannot be inferred from any subset of the set of relations $M_{si}^k$, a sub-ontology containing all of the relationships in $M_{si}^k$ is not considered safe with respect to the first subset, $R_s$. However, a safe sub-ontology with respect to the first subset, $R_s$, may be defined as any set of relations that does not contain all of the members of $M_{si}^k$. In one embodiment, $M_{si}^k$ is provided or derived in accordance with an ontology defined by Horn clauses.

Accordingly, if the method 100 determines in step 110 that the closure, F(Q), of the second subset, Q, intersects with the first subset, $R_s$, the method 100 proceeds to step 112 and concludes that the second subset, Q, is not safe (i.e., that information contained in the first subset, $R_s$, can be inferred from the information contained in the second subset, Q). Alternatively, if the method 100 determines in step 110 that the closure, F(Q), of the second subset, Q, does not intersect with the first subset, $R_s$, the method 100 proceeds to step 114 and concludes that the second subset, Q, is safe (i.e., that information contained in the first subset, $R_s$, cannot be inferred from the information contained in the second subset, Q).

Thus, for example, based on the triples $T_1$ through $T_4$ discussed above, the second subset, Q, would not be considered safe with respect to the first subset, $R_s$, because the triple $T_4$ can be inferred from the sub-ontology ($T_1$, $T_2$, $T_3$). However, if the second subset, Q, contained only ($T_1$, $T_2$), only ($T_1$, $T_3$) or only ($T_2$, $T_3$), then the second subset, Q, would be considered safe with respect to the first subset, $R_s$. Once a conclusion has been reached as to the safety of the second subset, Q, the method 100 terminates in step 116.

The present invention therefore preserves the integrity of sensitive information in an ontology framework by verifying the safety of a sub-ontology made available for querying, navigating, reasoning and other ontology processing applications. That is, the present invention verifies not only that sensitive information is not included in the sub-ontologies, but also that information from which the sensitive information can be inferred is not included in the sub-ontologies. This substantially reduces the likelihood of sensitive information being even inadvertently revealed.

Figure 2:
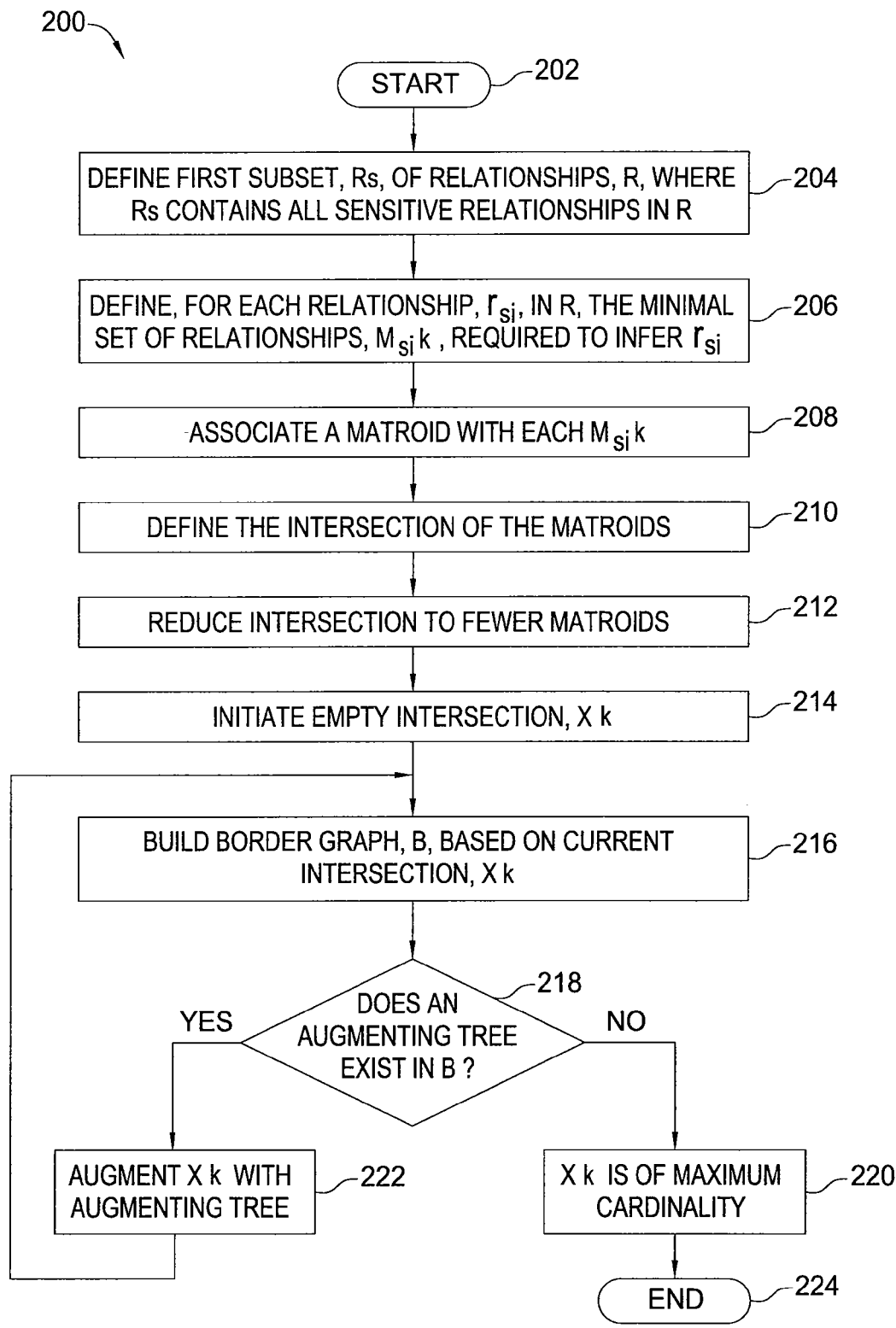
FIG. 2 is a flow diagram illustrating one embodiment of a method for determining a "best" safe ontology, according to the present invention.

FIG. 2 is a flow diagram illustrating one embodiment of a method 200 for determining a "best" safe ontology, e.g., for use in querying, navigating, reasoning and other ontology processing applications, according to the present invention. In particular, the method 200 optimizes the safe ontology, with respect to some function of the safe ontology. In the instance of the method 200, the function is a counting function. That is, the method 200 builds a safe ontology that retains as many relationships as possible (without revealing or allowing the inference of any information deemed sensitive).

The method 200 is initialized at step 202 and proceeds to step 204, where the method 200 defines a first subset, $R_s$, of the set of relationships, R, in the given ontology, O. Specifically, the first subset, $R_s$, contains all sensitive relationships (facts) in the set of relationships R. In one embodiment, the first subset, $R_s$, is defined for the method 200 by an external source (e.g., a human operator).

In step 206, the method 200 defines, for each relationship, $r_{si}$, in the first subset, $R_s$, the minimal set of relationships, $M_{si}^k$, required to infer the given relationship, $r_{si}$. In one embodiment, the minimal set of relationships, $M_{si}^k$, is defined for the method 200 by an external source (e.g., a human operator or another application). The goal of the method 200 thus becomes to find a maximum cardinality set of relationships, R*, such that R* does not include all of the relationships in any of the minimal sets of relationships, $M_{si}^k$.

Thus, in step 208, the method 200 associates a matroid with each of the minimal sets of relationships, $M_{si}^k$. A matroid M(E, F) is defined by a set of elements, E, and a family, F, of independent sets, F', of the elements, E, where the independent sets, F', have the following properties: (1) every subset of an independent set, F', is also independent; (2) if there are two independent sets $F_k'$ and $F_{k+1}'$, of cardinalities k and k+1, respectively, then there exists an element, $e_i$, in the set of elements, E, that is a member of $F_{k+1}'$, but not a member of $F_k'$, and such that $F_k' \cup e_i$ is an independent set. In one embodiment, the set of elements, E, is finite. The set of elements, E, may contain concepts, relationships, and/or individuals in the given ontology, O. Having established the matroids, the goal is to find a single set of relationships that are simultaneously independent in all of the minimal sets of relationships, $M_{si}^k$ (i.e., an independent set in an intersection of the matroids defined in step 208).

In step 210, the method 200 defines the intersection of the matroids. Formally, given k matroids (i.e., $M_1, M_2, \ldots, M_k$), all defined over the same set of elements, E, the intersection of the matroids is defined as $M_1 = (E, F_1)$, where a subset, F, of the set of elements, E, is a member of $F_1$ if and only if the subset, F, is independent in all of the individual matroids.

In step 212, the method 200 reduces the intersection problem to a fewer-matroid problem. In one embodiment, the intersection problem is reduced to a three-matroid problem (i.e., first matroid $M_1^{}$, second matroid $M_2^{}$ and third matroid $M_3^{**}$). One embodiment of a method for reducing a multi-matroid problem to a three-matroid problem is described with reference to FIG. 3. For the purposes of simplicity, the remainder of the discussion of the method 200 will assume that the intersection has been reduced to a three-matroid problem.

As described above, having reduced the number of matroids (e.g., to first matroid $M_1^{}$, second matroid $M_2^{}$ and third matroid $M_3^{**}$), the goal becomes to identify an independent set in an intersection of the matroids in the reduced set. In one embodiment, a polynomial-bounded algorithm to find an independent set of maximum cardinality in the intersection of two matroids relies on the concept of an alternating chain and is an extension of an algorithm for finding maximum cardinality independent sets in a single matroid (i.e., find elements that are independent of already selected elements, with the assurance that no element, once selected, will prevent the finding of an independent set of higher cardinality). The algorithm for finding an independent set of maximum cardinality in the intersection of two matroids first selects elements one at a time, maintaining independence in both matroids, until no further elements can be selected. However, it is not necessarily guaranteed that one can find a maximum cardinality intersection in this manner, and even though the algorithm may be adapted by means of an augmenting path, this process becomes complicated for problems involving the intersection of large numbers of matroids. Accordingly, an alternate embodiment of a method for finding the independent set in the intersection of the reduced set of matroids is described below with respect to steps 214-224.

Once the number of matroids for which an intersection must be found has been reduced (e.g., in step 208), the method 200 proceeds to step 214 and initializes an intersection, $X_k$, where k=0. Thus, the intersection, $X_k$, is currently an empty intersection.

In step 216, the method 200 forms a border graph, B, based on the current intersection, $X_k$. The border graph, B, is a bipartite graph whose node set is the base set of elements, E, for the reduced set of matroids (e.g., the first, second and third matroids, $M_1^{}$, $M_2^{}$ and $M_3^{**}$).

In step 218, the method 200 determines whether an augmenting tree, $T_k$, exists in the border graph, B. An augmenting tree is a sequence of elements, $e_j$, which can be added and/or removed from a set of elements that are independent in a given number of matroids, in order to create a larger set of elements that are independent in the matroids. The augmenting tree, $T_k$, is rooted at a starting element (node), $e_1$, that has no incoming paths; is terminated at an ending element (node), $e_x$, that has no outgoing paths; and is comprised of additional intermediate elements (nodes), $e_j$, having, at most, one path leading therein. In one embodiment, the elements, $e_j$, in the border graph, B, have multiple labels that are each defined as a tuple: (S, W), where S is the set of elements, $e_j$, in the path from the starting element, $e_1$, and W is the total weight of all elements, $e_j$, in the path (if the "best" subset of elements is defined as a subset of maximum weight, where each potential element in the subset is associated with an individual weight). An augmenting tree, $T_k$, rooted at the starting element, el, is thus found by labeling elements, $e_j$, from previously labeled elements, $e_k$. All paths in the augmenting tree must terminate in elements $e_k$ with degree zero. This resolves all cycles formed while performing augmentation.

In one embodiment, one or more paths in the border graph, B, corresponds to an augmenting tree or sequence from a first intersection, $X_p$, to a second intersection, $X_{p+1}$. The nodes of the border graph, B, are partitioned into the sets $X_p$ and $E-X_p$. For $e_i$ $X_p$ and $e_j$ $E-X_p$, there exists a directed edge ($e_j$, $e_i$) in the border graph, B, if $e_i$, when added to $I_p$, forms a cycle $C_j^{(1)}$ in the first matroid $M_1^{}$ and if $e_i$ is in $C_j^{(1)}$. A cycle, such as the cycle $C_j^{(1)}$, is a set that becomes independent with respect to given inference rules by removing an element from the set. Similarly, there exists a directed edge ($e_i$, $e_j$) in the border graph, B, if $e_i$, when added to $X_p$, forms a cycle $C_j^{(2)}$ in the second matroid $M_2^{}$ and if $e_j$ is in $C_i^{(2)}$, or if $e_i$, when added to $X_p$, forms a cycle $C_j^{(3)}$ in the third matroid $M_3^{}$ and if $e_j$ is in $C_i^{(3)}$. Edges of the border graph, B, that are based on a cycle in the first matroid, $M_1^{}$, are referred to as type-1 edges, while edges generally based on cycles in a matroid, $M_k^{**}$, are referred to as type-k edges.

In the simplest case, the starting element, $e_1$, has neither incoming nor outgoing edges, in which case the starting element, $e_1$, forms no cycles with $X_p$ in any of the matroids in the reduced set (e.g., first, second and third matroids $M_1^{}$, $M_2^{}$ and $M_3^{**}$). In this case, the starting element, $e_1$, is an augmenting tree by itself (i.e., it can be added to $X_p$ to form $X_{p+1}$).

The next most simple case would be where the starting element, $e_1$, has no incoming edges (i.e., does not form a cycle in the first matroid, $M_1^{}$, added to $X_p$), but does form a cycle in the second matroid $M_2^{}$. In this case, if the starting element $e_1$ is added to $X_p$, some other element, $e_j$ (where $e_j$ is connected to the starting element, $e_1$, via a type-2 edge in the border graph, B), must be removed from the cycle that the starting element, $e_1$, forms in the second matroid $M_2^{}$. Thus, an edge must be found from $e_j$ to some node $e_k$ in $X_p$, where $e_j$ is part of the cycle formed by $e_k$ in the first matroid, $M_1^{}$. It is also possible that the starting element, $e_1$, has no incoming edges, but forms cycles in both the first and second matroids, $M_2^{}$ and $M_3^{}$. If there is a single element, $e_j$, that is present in both of these cycles, the starting element, $e_1$, can be added; $e_j$ can be removed; and a third node, $e_k$, which includes $e_j$ in the cycle $e_k$ forms with $X_p$ in the first matroid, $M_1^{**}$, can be added. It should be noted that these cases are only exemplary, and an augmenting path may contain more or less than three elements.

If the method 200 determines in step 218 that an augmenting tree, $T_k$, does not exist in the border graph, B, then the method 200 concludes in step 220 that the current intersection, $X_k$, is of maximum cardinality before terminating in step 224. This maximum cardinality intersection, $X_k$, of the first, second and third matroids $M_1^{}$, $M_2^{}$ and $M_3^{**}$, represents the "optimal" sub-ontology (i.e., the sub-ontology that retains the most relationships out of all of the available safe sub-ontologies).

Alternatively, if the method 200 determines in step 218 that an augmenting tree, $T_k$, does exist in the border graph, B, then the method 200 proceeds to step 222 and augments the current intersection, $X_k$, in accordance with the augmenting tree, $T_k$. That is, the method 200 adds to the current intersection, $X_k$, all $e_j X_k$. The method 200 then returns to step 216 and proceeds as described above, first by forming a new border graph, B, based on the current intersection, $X_k$, which has been newly augmented.

Figure 3:
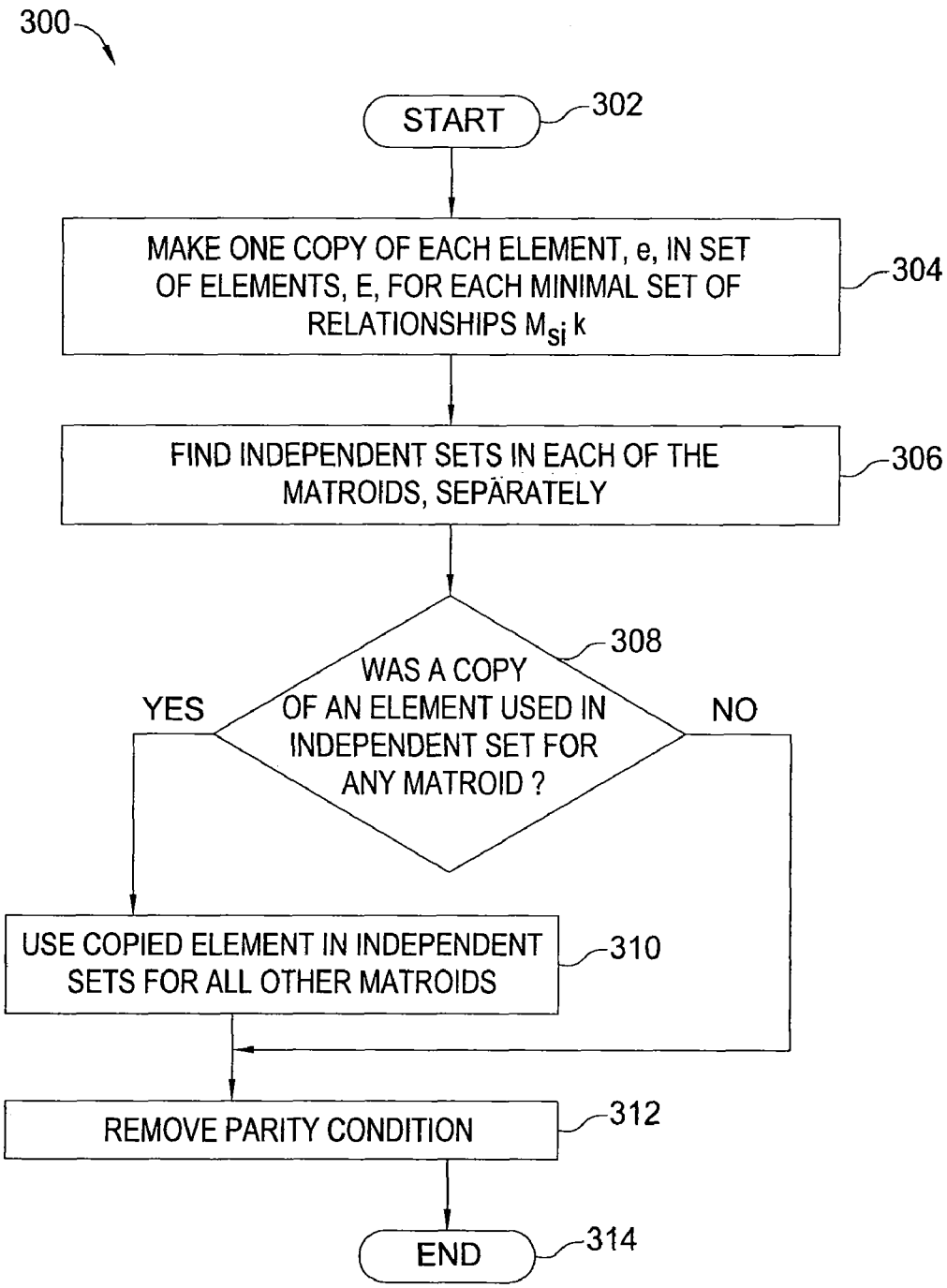
FIG. 3 is a flow diagram illustrating one embodiment of a method for reducing a multi-matroid problem to a three-matroid problem.

FIG. 3 is a flow diagram illustrating one embodiment of a method 300 for reducing a multi-matroid problem to a three-matroid problem. That is, the method 300 reduces a set of k matroids to a set of three matroids. The method 300 may be implemented, for example, in accordance with step 212 of the method 200.

The method 300 is initialized at step 302 and proceeds to step 304, where the method 300 makes one copy of each element, e, in the given set of elements, E, for each minimal set of relationships, $M_{si}^k$.

In step 306, the method 300 finds independent sets in each of the matroids separately. In step 308, the method 300 determines whether a copy, j, of an element, $e_i$, was used in the independent set from a given matroid, $M_j$. If the method 300 concludes in step 308 that a copy of the element, $e_i$, was used in the independent set from the given matroid, $M_j$, then the method 300 proceeds to step 310 and uses $e_i$ in the independent sets for all other matroids. This transforms the k-intersection problem in a matroid, M, with m elements into a problem of finding a maximum cardinality independent set in a new matroid M* with km elements, but also with an additional condition (a "parity condition") that all copies of a given element, e, be included in any solution.

In step 312, the method 300 removes the parity condition. Notably, if the method 300 concludes in step 308 that a copy of the element, $e_i$, was not used in the independent set from the given matroid, $M_j$, then the method 300 proceeds directly to step 312 without applying the copy of the element, $e_i$, in the independent sets for all other matroids.

In one embodiment, the parity condition is removed by defining three additional matroids on the elements of the new matroid M*. This is done by first defining a new element, $a_{ij}$, corresponding to each element, $e_{ij}$, in the new matroid, M*. This creates a first matroid, $M_1^{}$, where $M_1^{} = (E^{}, F_1^{})$, $E^{} = \{e_{ij}\} \cup \{a_{ij}\}$ and F is in $F^{}$ if all elements, e, in $F^{Ej}$ (the jth copies of the set of elements, E) are independent in $M_j$. Thus, $M_1$ enforces the constraints in the original matroids.

Secondly, to enforce the parity rule, one defines second and third matroids, respectively:

$$M_2^{} = (E^{}, F_2^{**})$$

$$M_3^{} = (E^{}, F_3^{**})$$

where F is in $F_2^{}$ if, for all i and j (j=1, 2, ..., k), F does not include both $e_{ij}$'s and $a_{ij}$; and F is in $F_3^{}$ if, for all i and j, F does not include both $e_{ij}$ and $a_{ij+1}$ for j<k and also does not include both $e_{ik}$ and $a_{i,1}$.

The goal of the constraints in $F_2^{}$ and $F_3^{}$ is to allow a full set of $e_{ij}$'s for a given intersection or a full set of $a_{ij}$'s for that given intersection, but not both. Now, one only has to solve the problem of finding the maximum intersection over the intersection of three matroids.

Once the three new matroids have been defined, the method 300 terminates in step 314.

Figure 4:
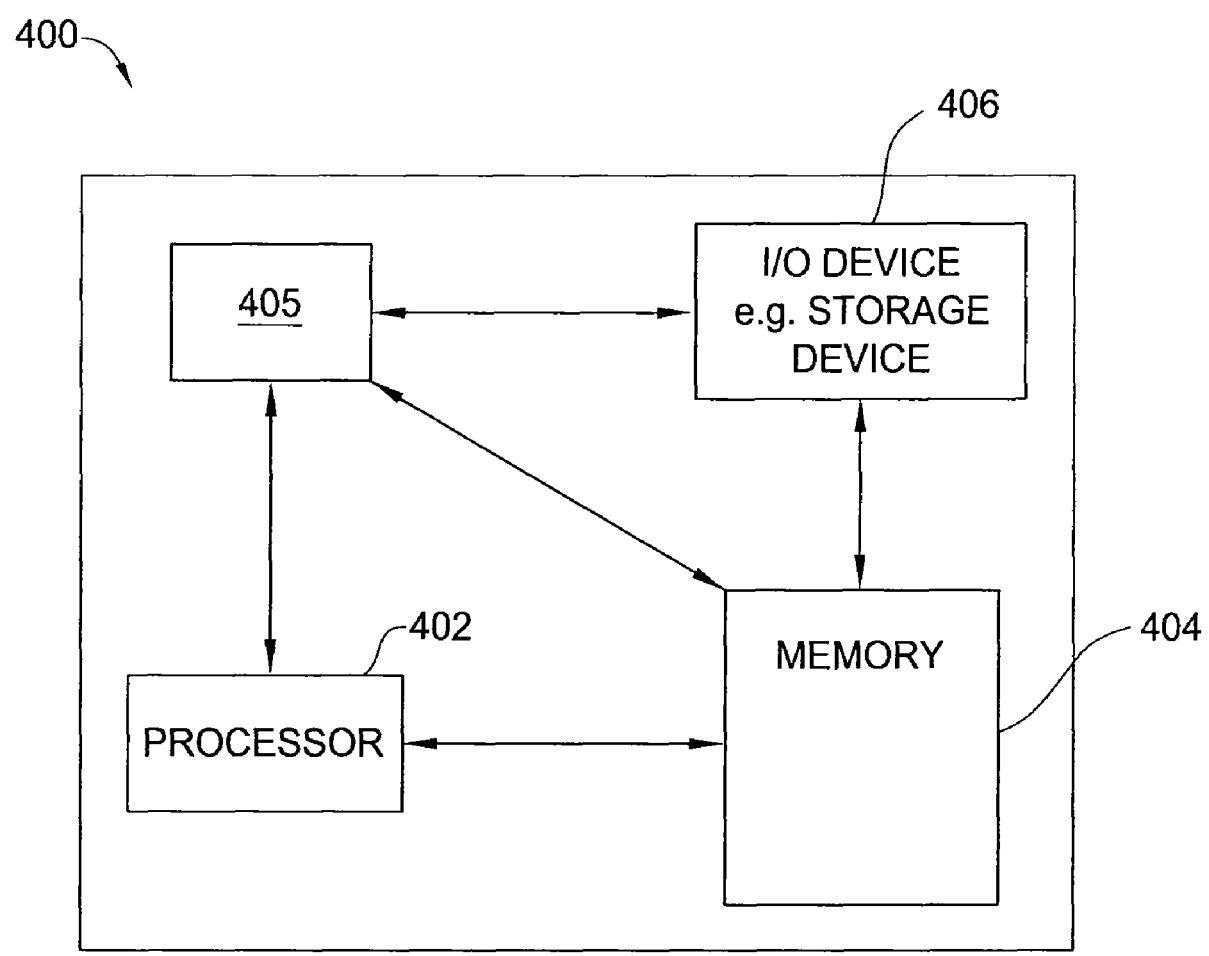
FIG. 4 is a high level block diagram of the present ontology testing method that is implemented using a general purpose computing device.

FIG. 4 is a high level block diagram of the present ontology testing method that is implemented using a general purpose computing device 400. In one embodiment, a general purpose computing device 400 comprises a processor 402, a memory 404, an ontology testing module 405 and various input/output (I/O) devices 406 such as a display, a keyboard, a mouse, a modem, and the like. In one embodiment, at least one I/O device is a storage device (e.g., a disk drive, an optical disk drive, a floppy disk drive). It should be understood that the ontology testing module 405 can be implemented as a physical device or subsystem that is coupled to a processor through a communication channel.

Alternatively, the ontology testing module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the ontology testing module 405 testing ontologies for safeness described herein with reference to the preceding Figures can be stored on a computer readable medium or carrier (e.g., RAM, magnetic or optical drive or diskette, and the like).

Thus, the present invention represents a significant advancement in the field of ontology processing. A method is provided that preserves the integrity of sensitive information in an ontology framework by verifying the safety of a sub-ontology made available for querying, navigating, reasoning and other ontology processing applications. That is, the present invention verifies not only that sensitive information is not included in the sub-ontologies, but also that information from which the sensitive information can be inferred is not included in the sub-ontologies. This substantially reduces the likelihood of sensitive information being even inadvertently revealed. Moreover, the present invention maximizes the amount of information that is provided in the safe ontology, so that the ontology can provide as much useful information as possible while still remaining "safe" with respect to the sensitive information.

While foregoing is directed to the preferred embodiment of the present invention, other and further embodiments of the invention may be devised without departing from the basic scope thereof, and the scope thereof is determined by the claims that follow.

The invention claimed is:

1. A method for testing a sub-ontology for safeness, the sub-ontology comprising one or more elements of a given ontology operated on by a general purpose computing device that performs automatic reasoning, the elements comprising one or more individuals that represent at least one person or object, one or more relationships defined between the one or more individuals, and one or more pieces of metadata representing at least one characteristic of the one or more individuals and the one or more relationships, the method comprising:

defining a first subset of the one or more relationships, the first subset comprising all sensitive relationships in the given ontology;

defining a second subset of the one or more relationships, the second subset comprising the sub-ontology; and determining, by a processor of the general purpose computing device, whether any relationship in the first subset can be inferred from any relationship in the second subset, given one or more inference rules.

2. The method of claim 1, wherein the determining comprises:

building a closure of the second subset; and determining whether the closure of the second subset intersects with the first subset.

3. The method of claim 2, further comprising:

determining that the sub-ontology is safe if the closure of the second subset does not intersect with the first subset.

4. The method of claim 3, further comprising:

storing the sub-ontology.

5. The method of claim 2, further comprising:

determining that the sub-ontology is not safe if the closure of the second subset intersects with the first subset.

6. The method of claim 1, wherein the first subset is defined by an external source.

7. The method of claim 1, wherein the second subset is defined by an external source.

8. A computer readable storage medium containing an executable program for testing a sub-ontology for safeness, the sub-ontology comprising one or more elements of a given ontology, the elements comprising one or more individuals that represent at least one person or object, one or more relationships defined between the one or more individuals, and one or more pieces of metadata representing at least one characteristic of the one or more individuals and the one or more relationships, where the program performs the steps of:

defining a first subset of the one or more relationships, the first subset comprising all sensitive relationships in the given ontology;

defining a second subset of the one or more relationships, the second subset comprising the sub-ontology; and determining whether any relationship in the first subset can be inferred from any relationship in the second subset, given one or more inference rules.

9. The computer readable storage medium of claim 8, wherein the determining comprises:

building a closure of the second subset; and determining whether the closure of the second subset intersects with the first subset.

10. The computer readable storage medium of claim 9, further comprising:

determining that the sub-ontology is safe if the closure of the second subset does not intersect with the first subset.

11. The computer readable storage medium of claim 10, further comprising:

storing the sub-ontology.

12. The computer readable storage medium of claim 9, further comprising:

determining that the sub-ontology is not safe if the closure of the second subset intersects with the first subset.

13. The computer readable storage medium of claim 8, wherein the first subset is defined by an external source.

14. The computer readable storage medium of claim 8, wherein the second subset is defined by an external source.

15. Apparatus for testing a sub-ontology for safeness, the sub-ontology comprising one or more elements of a given ontology, the elements comprising one or more individuals that represent at least one person or object, one or more relationships defined between the one or more individuals, and one or more pieces of metadata representing at least one characteristic of the one or more individuals and the one or more relationships, the apparatus comprising:

means for defining a first subset of the one or more relationships, the first subset comprising all sensitive relationships in the given ontology;

means for defining a second subset of the one or more relationships, the second subset comprising the sub-ontology; and means for determining whether any relationship in the first subset can be inferred from any relationship in the second subset, given one or more inference rules.

16. The apparatus of claim 15, wherein the means for determining comprises:

means for building a closure of the second subset; and means for determining whether the closure of the second subset intersects with the first subset.

17. The apparatus of claim 16, further comprising:

means for determining that the sub-ontology is safe if the closure of the second subset does not intersect with the first subset.

18. The apparatus of claim 17, further comprising:

means for storing the sub-ontology.

19. The apparatus of claim 16, further comprising:

means for determining that the sub-ontology is not safe if the closure of the second subset intersects with the first subset.

20. The apparatus of claim 15, wherein the first subset is defined by an external source.

* * * * *